(12) United States Patent
Narayanan et al.

(10) Patent No.: US 8,005,895 B2
(45) Date of Patent: Aug. 23, 2011

(54) DISTRIBUTED ROUTING OF CONFERENCES USING CONFERENCE IDENTIFIER

(75) Inventors: Sankaran Narayanan, Redmond, WA (US); Dhigha Sekaran, Redmond, WA (US); Charles A. Vermette, Redmond, WA (US); Hao Yan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 290 days.

(21) Appl. No.: 12/395,162

(22) Filed: Feb. 27, 2009

(65) Prior Publication Data

US 2010/0223334 A1    Sep. 2, 2010

(51) Int. Cl.
*G06F 15/16* (2006.01)
*H04M 1/00* (2006.01)
*H04N 7/14* (2006.01)

(52) U.S. Cl. ............... 709/204; 379/202.01; 348/14.09
(58) Field of Classification Search .......... 709/203–205; 379/158, 202.01; 348/14.1, 14.08, 14.09
See application file for complete search history.

(56) References Cited

U.S. PATENT DOCUMENTS

| | | | | |
|---|---|---|---|---|
| 5,920,546 A * | 7/1999 | Hebert et al. | | 370/260 |
| 6,671,262 B1 | 12/2003 | Kung et al. | | |
| 7,251,254 B2 | 7/2007 | Bond et al. | | |
| 7,330,899 B2 * | 2/2008 | Wong | | 709/230 |
| 7,353,255 B2 | 4/2008 | Acharya et al. | | |
| 7,376,129 B2 | 5/2008 | Acharya et al. | | |
| 7,469,384 B2 * | 12/2008 | Thompson et al. | | 715/758 |
| 2001/0040217 A1 * | 11/2001 | Mizuoka et al. | | 250/358.1 |
| 2002/0075306 A1 * | 6/2002 | Thompson et al. | | 345/753 |
| 2005/0206721 A1 | 9/2005 | Bushmitch et al. | | |
| 2005/0207361 A1 | 9/2005 | Rosenberg et al. | | |
| 2007/0263822 A1 * | 11/2007 | Chang et al. | | 379/202.01 |
| 2007/0276913 A1 | 11/2007 | Olson et al. | | |
| 2008/0010347 A1 * | 1/2008 | Houghton et al. | | 709/205 |
| 2008/0037748 A1 * | 2/2008 | Jefferson et al. | | 379/202.01 |
| 2008/0101577 A1 | 5/2008 | Frankel | | |
| 2008/0159507 A1 | 7/2008 | Virolainen et al. | | |
| 2008/0198770 A1 | 8/2008 | Saha et al. | | |
| 2008/0212499 A1 * | 9/2008 | Maes | | 370/265 |
| 2008/0259824 A1 | 10/2008 | Frankel | | |
| 2009/0168985 A1 * | 7/2009 | Yu et al. | | 379/202.01 |

OTHER PUBLICATIONS

"International Search Report", Mailed Date: Nov. 26, 2010, Application No. PCT/US2010/023258, Filed Date: Feb. 5, 2010, pp. 9.
"Microsoft Office Communications Server 2007 Enterprise Voice Planning and Deployment Guide a Software-Powered VoIP Solution", retrieved at <<http://download.microsoft.com/download/d/b/6/db641148-427b-41d3-9f20-7ffbddaf65b8/OCS_VoIP_Guide.doc>>, Jul. 2007, pp. 134. Steinmann Martin, "SIP Trunking Interoperability Program", retrieved at <<http://www.sipfoundry.org/>>, Sep. 27, 2008, pp. 1-7.
"Building a Foundation for SIP with Avaya Intelligent Communications Solutions'", retrieved at <<http://www.avaya.com/master-usa/en-us/resource/assets/whitepapers/mis3149.pdf>>, Jul. 2006, pp. 35.

\* cited by examiner

*Primary Examiner* — Yasin Barqadle
(74) *Attorney, Agent, or Firm* — Turk IP Law, LLC (57) ABSTRACT

Users attempting to join a conference facilitated by an enhanced communication system employing a network communication protocol such as SIP and having a distributed architecture are enabled to request the conference through a numeric conference identifier. The conference directory identifier is assigned to an associated resource, rather than directly to a pool of resources in the communication system. If a pool is decommissioned, any conference directories with remaining data may be assigned to other pools, like users may be moved, to ensure continuity of the system.

18 Claims, 7 Drawing Sheets

DISTRIBUTED ROUTING OF CONFERENCES USING CONFERENCE IDENTIFIER

BACKGROUND

Modern communication systems have a large number of capabilities including integration of various communication modalities with different services. For example, instant messaging, voice/video communications, data/application sharing, white-boarding, and other forms of communication may be combined with presence and availability information of subscribers. Another capability of such enhanced communication systems is conferencing between subscribers of various networks.

While communication between endpoints within an enhanced communication system is commonly facilitated through an advanced communication protocol such as Session Initiation Protocol (SIP), traditional networks such as Public Switched Telephone Network (PSTN) are not capable of taking advantage of these protocols. Thus, when a user employing a legacy device wishes to join a conference, they may not be able to take advantage of advanced features of communication protocols like identifying a conference server by its Uniform Resource Identifier (URI).

Some conventional systems enable users to identify a conference they want to join by a numeric identifier, and then look up the conference in a look-up table of conference database. This means, the components of the communication system (i.e. servers) would have to have a static structure limiting capabilities of the communication system and increasing its vulnerability to crashes and delays due to equipment failure.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to enabling subscribers of legacy communication networks join a conference facilitated by an enhanced communication system through a numeric conference identifier, where the communication system has a distributed architecture. According to some embodiments, a conference directory identifier is assigned to an associated resource, rather than directly to a pool of resources in the communication system. If a pool is decommissioned, any conference directories with remaining data may be assigned to other pools, like users may be moved, to ensure continuity of the system.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

As briefly described above, conferences may be facilitated by enabling users from legacy networks to enter a numeric conference identifier in a distributed conferencing system. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media. The computer program product may also be a propagated signal on a carrier (e.g. a frequency or phase modulated signal) or medium readable by a computing system and encoding a computer program of instructions for executing a computer process.

Throughout this specification, the term "platform" may be a combination of software and hardware components for managing enhanced communications including conferencing. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Figure 1:
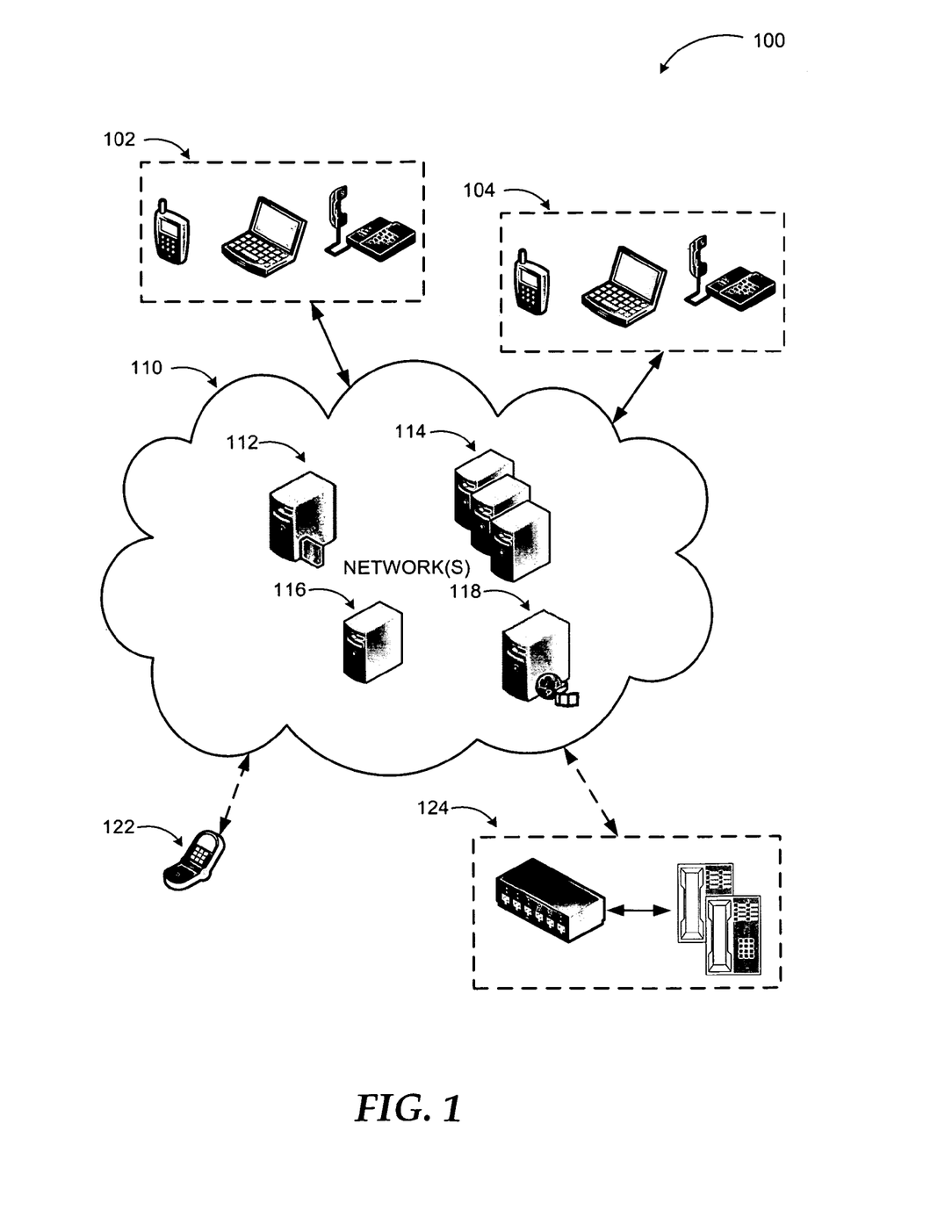
FIG. 1 is a diagram illustrating an example unified communications system, where embodiments may be implemented for multimodal escalation to endpoints.

Referring to FIG. 1, diagram 100 of an example unified communications system, where embodiments may be practiced, is illustrated. A unified communication system is an example of modern communication systems with a wide range of capabilities and services that can be provided to subscribers. A unified communication system is a real-time communications system facilitating instant messaging, presence, audio-video conferencing, web conferencing functionality, and comparable capabilities.

In a unified communication ("UC") system such as the one shown in diagram 100, users may communicate via a variety of end devices (102, 104), which are client devices of the UC system. Each client device may be capable of executing one or more communication applications for voice communication, video communication, instant messaging, application sharing, data sharing, and the like. In addition to their advanced functionality, the end devices may also facilitate traditional phone calls through an external connection such as through PBX 124 to a Public Switched Telephone Network ("PSTN"). End devices may include any type of smart phone, cellular phone, any computing device executing a communication application, a smart automobile console, and advanced phone devices with additional functionality.

UC Network(s) 110 includes a number of servers performing different tasks. For example, UC servers 114 provide registration, presence, and routing functionalities. Routing functionality enables the system to route calls to a user to anyone of the client devices assigned to the user based on default and/or user set policies. For example, if the user is not available through a regular phone, the call may be forwarded to the user's cellular phone, and if that is not answering a number of voicemail options may be utilized. Since the end devices can handle additional communication modes, UC servers 114 may provide access to these additional communication modes (e.g. instant messaging, video communication, etc.) through access server 112. Access server 1 12 resides in a perimeter network and enables connectivity through UC network(s) 110 with other users in one of the additional communication modes. UC servers 114 may include servers that perform combinations of the above described functionalities or specialized servers that only provide a particular functionality. For example, home servers providing presence functionality, routing servers providing routing functionality, rights management servers, and so on. Similarly, access server 112 may provide multiple functionalities such as firewall protection and connectivity, or only specific functionalities.

Audio/Video (A/V) conferencing server 118 provides audio and/or video conferencing capabilities by facilitating those over an internal or external network. Mediation server 116 mediates signaling and media to and from other types of networks such as a PSTN or a cellular network (e.g. calls through PBX 124 or from cellular phone 122). Mediation server 116 may also act as a Session Initiation Protocol (SIP) user agent.

In a UC system, users may have one or more identities, which is not necessarily limited to a phone number. The identity may take any form depending on the integrated networks, such as a telephone number, a Session Initiation Protocol (SIP) Uniform Resource Identifier (URI), or any other identifier. While any protocol may be used in a UC system, SIP is a preferred method.

SIP is an application-layer control (signaling) protocol for creating, modifying, and terminating sessions with one or more participants. It can be used to create two-party, multi-party, or multicast sessions that include Internet telephone calls, multimedia distribution, and multimedia conferences. SIP is designed to be independent of the underlying transport layer.

SIP clients may use Transport Control Protocol ("TCP") to connect to SIP servers and other SIP endpoints. SIP is primarily used in setting up and tearing down voice or video calls. However, it can be used in any application where session initiation is a requirement. These include event subscription and notification, terminal mobility, and so on. Voice and/or video communications are typically done over separate session protocols, typically Real-time Transport Protocol ("RTP").

In a system according to embodiments, a Conference Auto Attendant (CAA) server component operates in conjunction with a mediation server that acts as a switch between PSTN and VoIP audio and sends the conference identifier in a request to any resource pool in the UC system. The CAA performs Dual Tone Multi-Frequency (DTMF) processing to translate the touch tone input into a SIP URI and transfer the call. The pool decodes the conference identifier according to an algorithm and uses the conference directory configuration information to locate the pool responsible for it. If the current pool is responsible, it responds directly to the request. Otherwise, it sends a message to the responsible pool and proxies the response back to the CAA. Thus, the CAA is an additional processing component that briefly handles the call, entirely within VoIP, and interprets the user's input before transferring them to the final termination point for the audio on the A/V server (or MCU).

While the example system in FIG. 1 has been described with specific components such as mediation server, A/V server, and similar devices, embodiments are not limited to this system of the example components and configurations. A service for managing multimodal communications with escalation during a same conversation may be implemented in other systems and configurations employing fewer or additional components.

Figure 2:
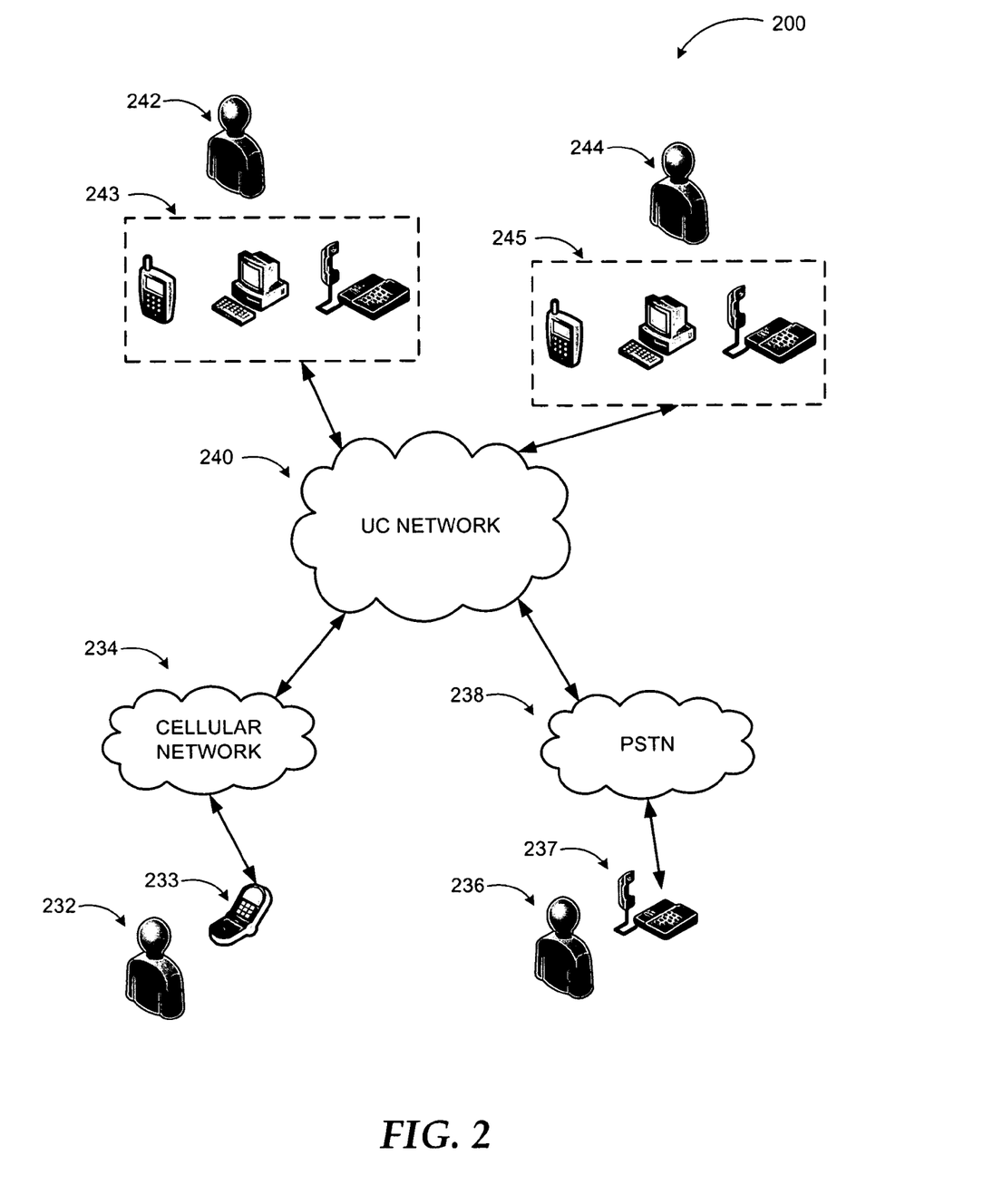
FIG. 2 is a conceptual diagram illustrating a basic conference between different networks in a system according to embodiments.

FIG. 2 is a conceptual diagram illustrating a basic conference between different networks in a system according to embodiments. While a system according to embodiments may include a number of different networks, servers, client devices, and the like such as those illustratively discussed in FIG. 1, example ones relevant to embodiments are shown in FIG. 2.

In the example system of diagram 200, users 242 and 244 participate in a conference through one of their UC endpoints 243 and 245, respectively. The servers facilitating the conference are part of UC network 240. Users 232 and 236 are enabled to participate in the conference by calling in from other networks such as cellular network 234 (using cellular phone 233) and PSTN 238 (using telephone 237), respectively, and entering a numeric conference identifier as discussed below.

In order to route requests efficiently, a real-time enhanced communication system such as a UC system requires means to route requests to a conference from any node in the system.

A single point of failure is a hazard to scalability, availability, and performance of the system. However, if the conference list is volatile, full replication of all routing data may cause routing to fail because of delays in propagation between nodes. A compromise is to replicate a small set of non-volatile data to all nodes establishing discrete and easily identifiable centers of authority for conference location. If each node is responsible for at least one such discrete piece of the overall routing table, it is possible to assign identifiers to conferences locally using a tiered scheme and find them globally following a chain of authority to the assigner.

In a UC system, clients typically connect to a conference using a resource identifier based on the SIP URI or the organizing user. The SIP URIs are non-volatile and serve as the basis for request routing. However, some clients may not be well suited to working with alphanumeric data, such as URIs. Clients with input based on a numeric keypad, such as a phone, may need strictly numeric inputs.

Each pool in the UC system is created with a special resource associated with it, called a conference directory. Each conference directory has a particular numeric identifier assigned to it called the conference directory identifier. The assigned conference directory identifier is unique to each conference. Assigning a uniquely identifiable context to each user may be prohibitive in a scale deployment environment. It is also wasteful of the space of identifiers, since each naming authority would be responsible for only a small number of identifiers. The bits required to represent an identifier may grow more quickly overall because of wasted space and especially fast for heavy users because of the increased size of the authority portion of the key.

Associating the conference directory identifier to an associated resource, rather than directly to the pool, has the advantage of allowing the authority associated with the conference directory to outlive the pool. If a pool is decommissioned, any conference directories with remaining data may be assigned to other pools, like users may be moved, to ensure continuity of the system.

At conference schedule time, a UC system pool may check its configuration for a base numeric identifier to use. Then, it may allocate a second number, called the local identifier. The second number may be determined virtually by any scheme. According to one embodiment, most recently used data for the identifiers may be mixed with random information. According to another embodiment, the second number may be assigned following a predefined order. This number is unique among all currently mapped conference resources. The multi-part key {conference directory identifier, local identifier} may be stored in a UC system database and associated with the identity of the conference.

According to some embodiments, the multipart key may be formatted before being presented to a user. The object is to create a single number that is easy to remember and appears pseudo-random. Pseudo-random numbers increase user confidence in the uniqueness of the identifier and its association with a given conference.

While any algorithm may be used to format the multipart key into a pseudo-random number, the following algorithm may be employed to generate the unique and pseudo-random conference identifier according to one embodiment:

1) Append the ceiling function of $Log_{10}$(conference directory identifier), the conference directory identifier, and the local identifier, creating a single string of digits (e.g. conference directory identifier: 2 and local identifier: 345 results in the digit string 12345). A ceiling function maps a real number to a next smallest integer not less than the real number (e.g. ceiling(5)=6).

2) Reverse the digit string from step 1. However, if the last digit in the original string is 0, the first and last digits remain in place (e.g. 12345 becomes 54321 or 67890 becomes 69870).

3) Replace each digit with itself, plus the digit to the left, modulus 10. The operation chains from left to right and feeds back into itself. So, the third digit is added with the results of summing the first and second digits. The leftmost digit is unchanged (e.g. 54321 becomes 59245).

The above described algorithm produces an encoded conference identifier with the following useful properties: the conference identifier is a single number, rather than a multipart key; the conference identifier always begins with a non-zero digit; several conference identifiers sharing the same conference directory identifier will appear to be unrelated; and the obfuscation is easily reversible by executing a reverse algorithm.

When user 232 or 236 enters an assigned conference identifier to join a conference, the above steps may be executed in reverse order, and the converse operations are performed at each step enabling the UC system to resolve the identifier and find to correct conference for the user.

Figure 3:
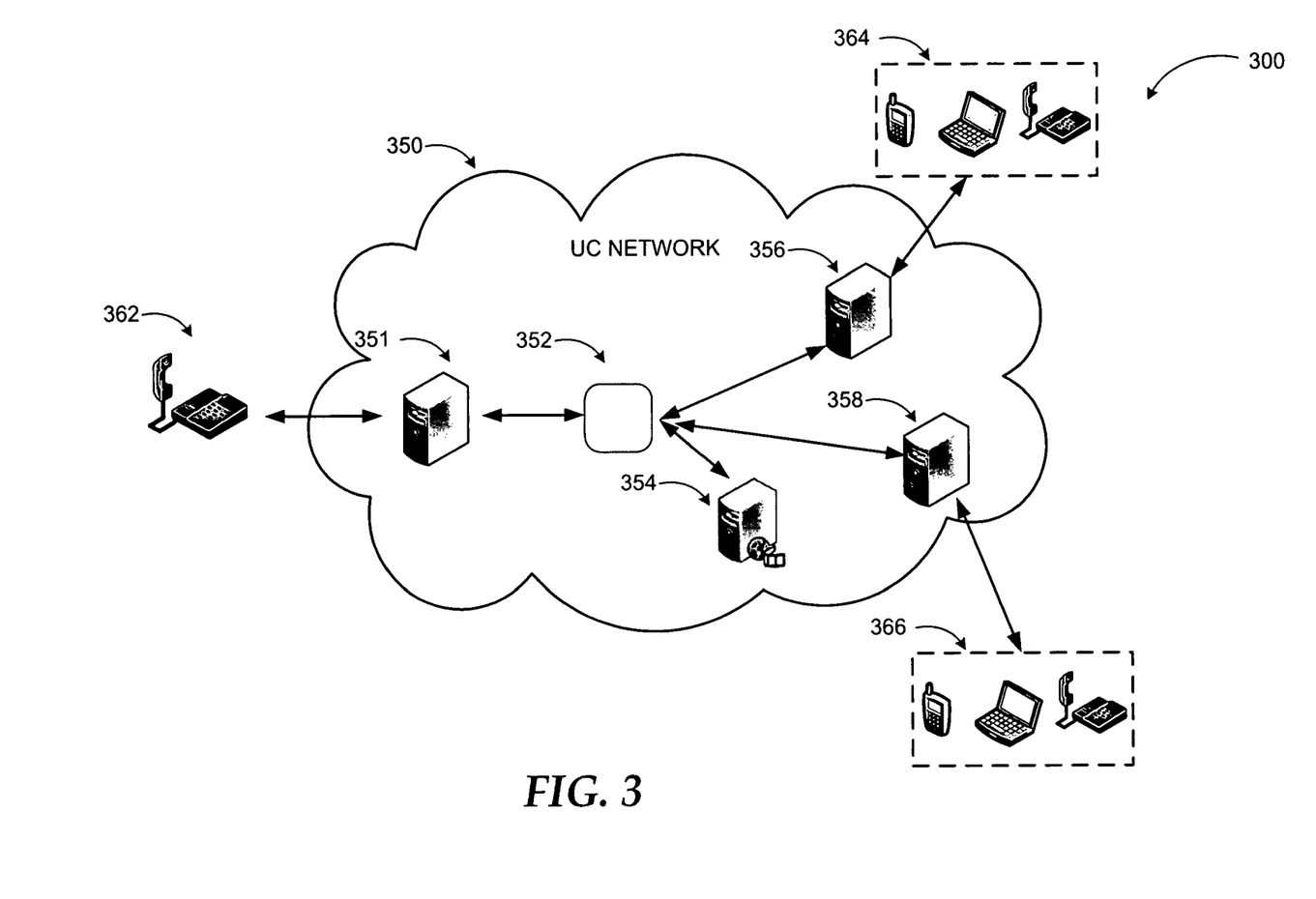
FIG. 3 illustrates example components involved in facilitating conferencing in a unified communication system according embodiments.

FIG. 3 illustrates example components involved in facilitating conferencing in a unified communication system according to embodiments. While a system according to embodiments is likely to include a number of servers, client devices, and services such as those illustratively discussed in FIG. 1, only those relevant to embodiments are shown in FIG. 3.

In a system according to embodiments, a Conference Auto Attendant (CAA) server component 352 is a processing component that handles a call briefly before transferring it to a final termination point for the audio in conjunction with a mediation server that acts as a switch between PSTN and VoIP audio. Thus, CAA server component 352 is a DTMF-driven user agent implemented within the UC system that terminates a call from telephone 362 via mediation server 351, looks up the conference resource according to a user-entered conference identifier, and makes the SIP requests to transfer the call to the conference. According to one embodiment, the CAA server component 352 may send the conference identifier in a request to any resource pool in the UC system. The pool may decode the conference identifier according to an algorithm such as the one discussed above and use the conference directory configuration information to locate the pool responsible for the conference. If the current pool is responsible, it responds directly to the request. Otherwise, it sends a message to the responsible pool and proxies the response back to the CAA server component.

In the illustrated system of diagram 300, CAA server component 352 communicates with mediation server 351 within UC network 350. PSTN terminates on the mediation server 351, which routes the call to the CAA 352. The CAA 352 facilitates the SIP routing to the resource pools such as A/V server 354, conference servers 356 or 358, etc. Once the correct pool is identified (the conference identifier decoded), the conference may be facilitated between UC network 350 users through their endpoints (e.g. 364, 366) and the out-of-network caller through their calling device (e.g. PSTN phone 362). Of course multiple conference servers may be involved in facilitating the conference in the distributed architecture of the UC system.

Figure 4:
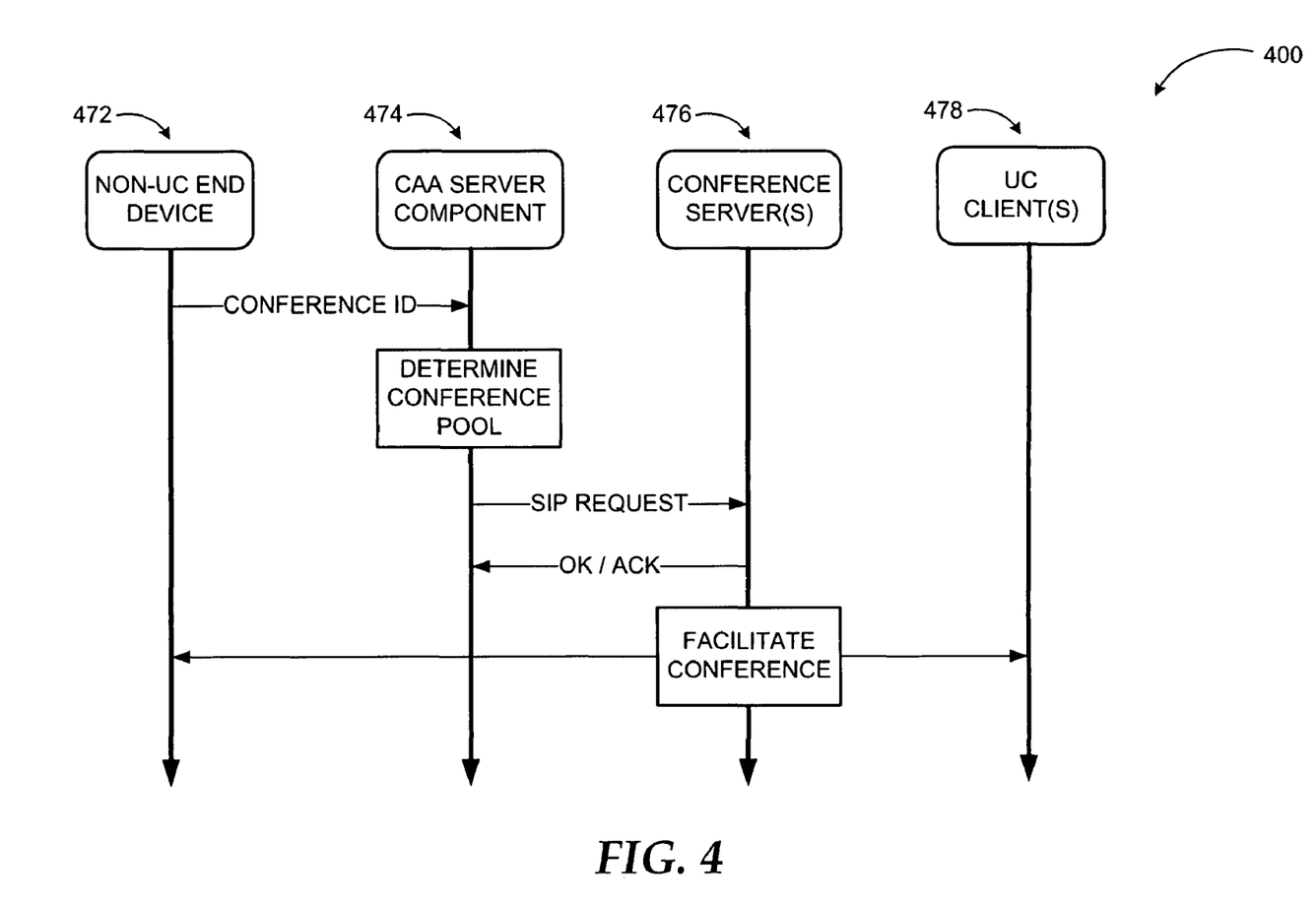
FIG. 4 is an action diagram illustrating interactions between different components of a communication system according to embodiments.

FIG. 4 is an action diagram illustrating interactions between different components of a communication system according to embodiments. As discussed above, a request for joining a conference may be received at a CAA server component 474 from a non-UC end device 472 such as a PSTN phone, a cellular phone, and similar ones. The request may include a numeric conference identifier. The identifier is typically encoded by the system based on an identifier of a responsible resource, which is associated with a given server/pool, and a local identifier using an algorithm that generates a pseudo-random number to increase user confidence.

CAA server component 474 decodes the conference identifier looking up the responsible conference pool and communicating with the conference server(s) 476 employing SIP. Once the connection is established, the conference between UC client(s) 478 and non-UC device 472 is facilitated as discussed above.

While many communication modes and capabilities may be employed during an established conference, example ones are described above for illustration purposes. The scenarios, example systems, conversation modes, and configurations discussed herein are for example purposes, and do not constitute limitations on embodiments. Other forms of communications, configurations, capabilities, and scenarios may be used in implementing conference look-up based on a numeric conference identifier in a distributed environment in a similar manner using the principles described herein.

Figure 5:
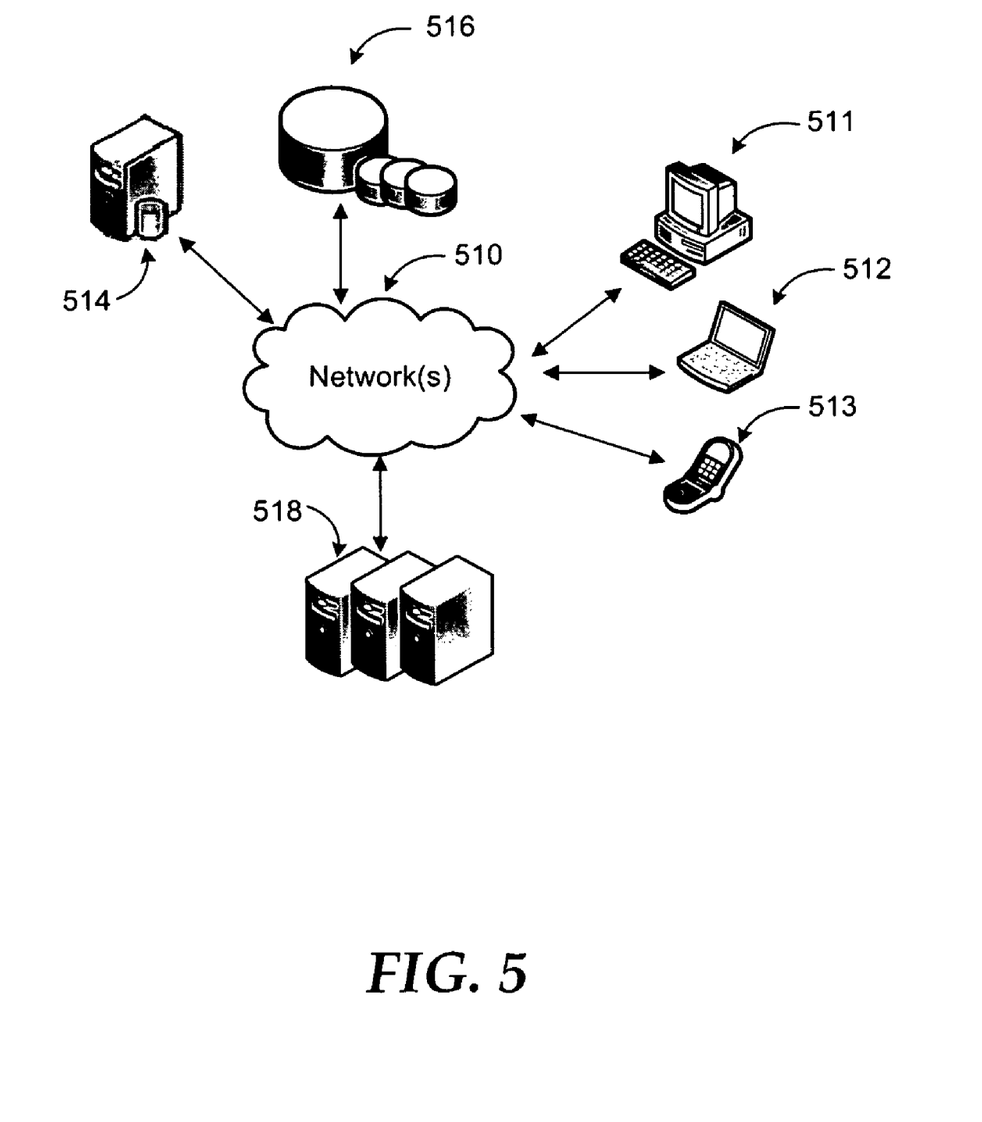
FIG. 5 is a networked environment, where a system according to embodiments may be implemented.

FIG. 5 is an example networked environment, where embodiments may be implemented. A platform providing conferencing services in a distributed architecture with numeric conference identifier capability may be implemented via software executed over one or more servers 518 such as a hosted service. The platform may communicate with client applications on individual computing devices such as a cellular phone 513, a laptop computer 512, and desktop computer 511 (client devices) through network(s) 510.

As discussed above, modern communication technologies such as UC services enable subscribers to utilize a wide range of computing device and application capabilities in conjunction with communication services. This means, a subscriber may use one or more devices (e.g. a regular phone, a smart phone, a computer, a smart automobile console, etc.) to facilitate communications. Depending on the capabilities of each device and applications available on each device, additional services and communication modes may be enabled.

Client devices 511-513 are used to facilitate communications through a variety of modes between subscribers of the communication system including audio or multi-mode conferences. One or more of the servers 518 may enable client devices not equipped to communicate with the system through SIP to enter a numeric identifier for the conference encoded as discussed above, and find the associated conference to connect the client device. Information associated with subscribers and facilitating conference communications may be stored in one or more data stores (e.g. data store 516), which may be managed by any one of the servers 518 or by database server 514.

Network(s) 510 may comprise any topology of servers, clients, Internet service providers, and communication media. A system according to embodiments may have a static or dynamic topology. Network(s) 510 may include a secure network such as an enterprise network, an unsecure network such as a wireless open network, or the Internet. Network(s) 510 may also coordinate communication over other networks such as PSTN or cellular networks. Furthermore, network(s) 510 may include short range wireless networks such as Bluetooth or similar ones. Network(s) 510 provides communication between the nodes described herein. By way of example, and not limitation, network(s) 510 may include wireless media such as acoustic, RF, infrared and other wireless media.

Many other configurations of computing devices, applications, data sources, and data distribution systems may be employed to implement a communication system enabling numeric conference identifier entry for conferencing in a distributed environment. Furthermore, the networked environments discussed in FIG. 5 are for illustration purposes only. Embodiments are not limited to the example applications, modules, or processes.

Figure 6:
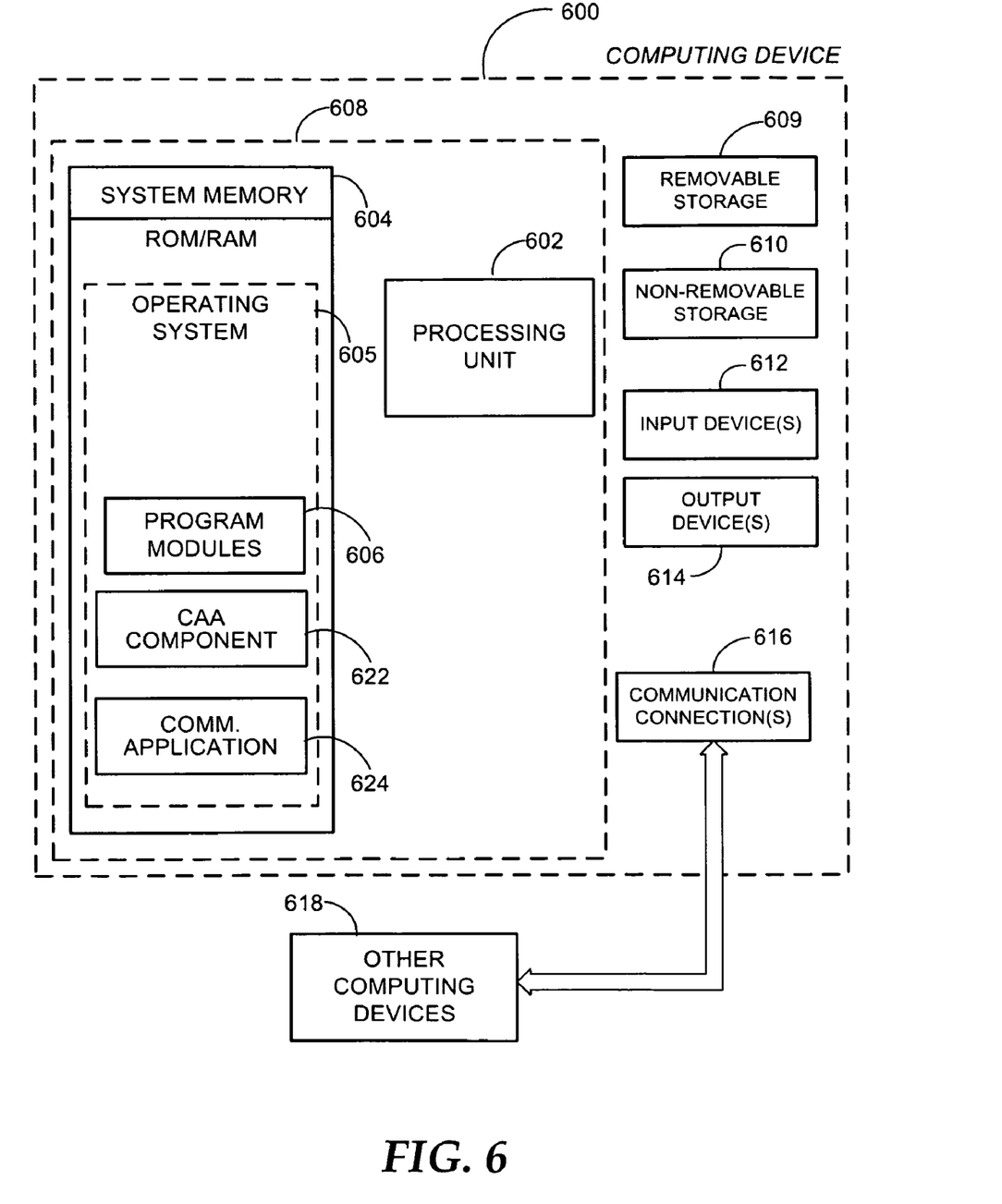
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as computing device 600. In a basic configuration, computing device 600 may be a conference server executing a communication application as part of an enhanced communication system and include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the platform, such as the WINDOWS® operating systems from MICROSOFT CORPORATION of Redmond, Wash. The system memory 604 may also include one or more software applications such as program modules 606, CAA component 622, and communication application 624.

CAA component 622 processes DTMF input to translate touch tone signals into a SIP URI and transfer the call. Communication application 624 may be part of a service that facilitates communication through various modalities between client applications, servers, and other devices. Communication application 624 may facilitate conferences in a distributed server environment as discussed previously. This basic configuration is illustrated in FIG. 6 by those components within dashed line 608.

Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 600. Any such computer readable storage media may be part of computing device 600. Computing device 600 may also have input device(s) 612 such as keyboard, mouse, pen, voice input device, touch input device, and comparable input devices. Output device(s) 614 such as a display, speakers, printer, and other types of output devices may also be included. These devices are well known in the art and need not be discussed at length here.

Computing device 600 may also contain communication connections 616 that allow the device to communicate with other devices 618, such as over a wired or wireless network in a distributed computing environment, a satellite link, a cellular link, a short range network, and comparable mechanisms. Other devices 618 may include computer device(s) that execute communication applications, other directory or policy servers, and comparable devices. Communication connection(s) 616 is one example of communication media. Communication media can include therein computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 7:
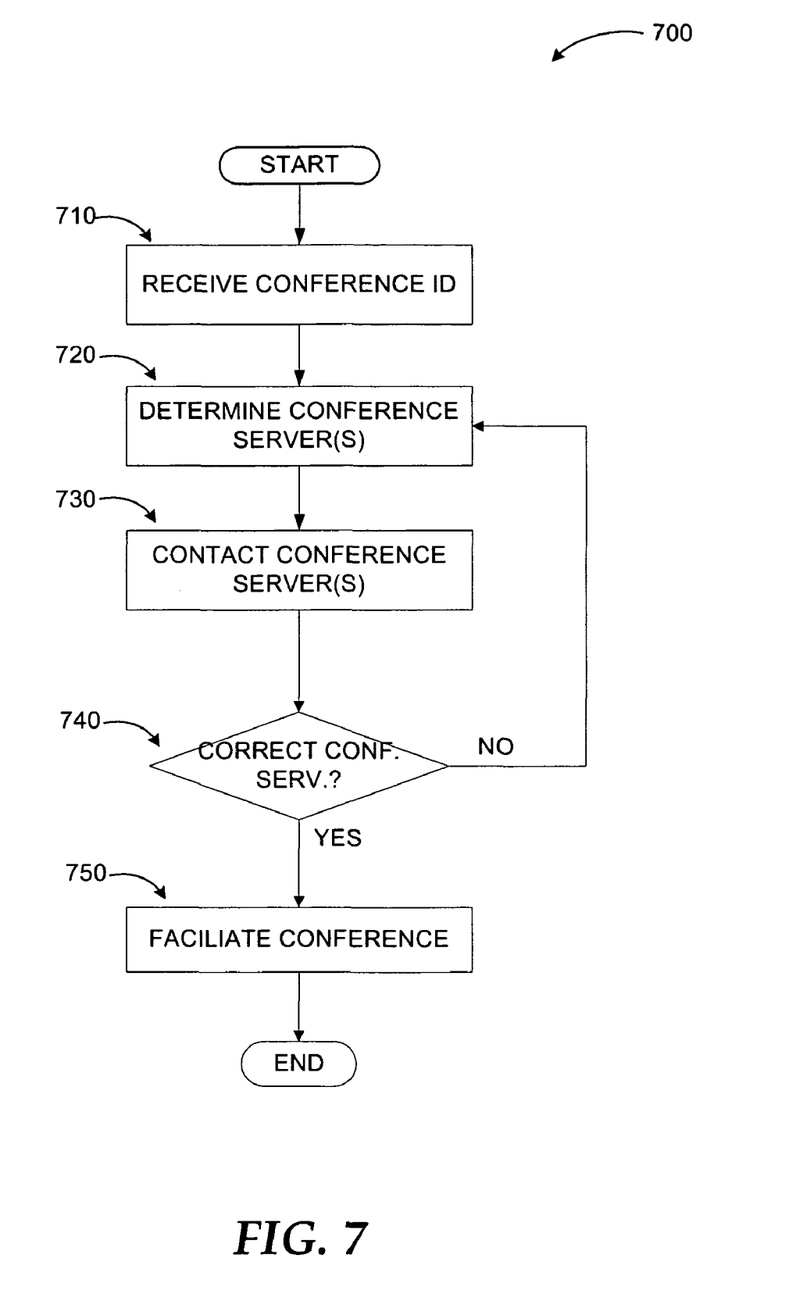
FIG. 7 illustrates a logic flow diagram for facilitating a conference using a conference identifier in a communication system according to embodiments.

FIG. 7 illustrates a logic flow diagram of process 700 for facilitating a conference using a conference identifier in a communication system according to embodiments. Process 700 may be implemented as part of a communication system that facilitates conferences between users of different networks.

Process 700 begins with operation 710, where a numeric conference identifier is received from a user outside a SIP or similar protocol capable network. The numeric identifier is encoded using an algorithm as discussed previously. At operation 720, a conference server responsible for the conference identified by the numeric identifier is determined by decoding the numeric identifier according to a reverse algorithm as described in conjunction with FIG. 2 and FIG. 3.

At operation 730, the conference server is contacted. If the conference server is determined to be incorrect or is not responding (operation 740), a new conference server may be determined back at operation 720. Otherwise, the conference server connects the user to the requested conference facilitating the communication between the participants at operation 750.

The operations included in process 700 are for illustration purposes. A communication service with numeric conference entry capability in a distributed environment may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for facilitating conferencing in a distributed communication system, the method comprising:
   receiving a request to join a conference, the request including a numeric conference identifier associated with the conference, wherein the numeric conference identifier is generated at conference scheduling time employing a logical inverse of the predefined algorithm by:
      combining a numeric identifier assigned to a conference resource and a random number,
      appending a ceiling function of a logarithm of the numeric identifier and the random number to generate a string of digits,
      reversing the digits in the string of digits, wherein a first and a last digit in the string of digits remain in their place if the last digit is zero,
      replacing the digits with a combination of themselves and a digit to their left, wherein the first digit remains unchanged, and
      formatting the combination to derive the numeric conference identifier unique to the conference;
   determining the conference resource associated with the requested conference based on decoding the numeric conference identifier, wherein the conference resource is part of a distributed architecture of conference resources;
   contacting the determined conference resource employing an enhanced network communication protocol; and
   facilitating the conference upon receiving an affirmative response from the contacted conference resource.

2. The method of claim 1, further comprising:
   encoding the numeric conference identifier for the conference based on a combination of a conference directory identifier assigned to the conference resource and a local identifier at conference scheduling time; and
   providing the numeric conference identifier to a user invited to join the conference.

3. The method of claim 2, wherein the local identifier is a combination of a recently used identifier with a random number.

4. The method of claim 3, wherein the combination of the conference directory identifier assigned to the conference resource and the local identifier are formatted according to a predefined algorithm to derive the numeric conference number such that the numeric conference identifier is a pseudo-random number unique to the requested conference.

5. The method of claim 4, further comprising:
   decoding the numeric conference identifier employing a predefined inverse algorithm.

6. The method of claim 1, wherein the enhanced network communication protocol is Session Initiation Protocol (SIP).

7. The method of claim 6, wherein determining the conference resource includes determining a SIP Universal Resource Identifier (URI) of the conference resource.

8. The method of claim 1, wherein the conference resource is part of a Unified Communication (UC) system, and wherein the request is received from subscriber of a non-UC network.

9. The method of claim 8, wherein the non-UC network includes one of: a Public Switched Telephone Network (PSTN) and a cellular phone network.

10. The method of claim 1, wherein the conference includes one of an audio conference and a video conference.

11. A communication system for facilitating conferencing within a Unified Communication (UC) network with distributed resource architecture, the system comprising:
- a plurality of communication servers configured to facilitate multi-modal communications including conferencing between end-points of the system employing Session Initiation Protocol (SIP);
- a mediation server configured to facilitate communication with the plurality of communication servers employing SIP;
- a Conference Auto Attendant (CAA) endpoint receiving communications from non-UC network, the CAA endpoint configured to:
  - receive a request to join a conference from a non-UC network caller, the request including a numeric conference identifier associated with the conference;
  - generate the numeric conference identifier at conference scheduling time employing a logical inverse of a predefined algorithm by:
    - combining a numeric identifier assigned to a communication server and a random number;
    - appending a ceiling function of a logarithm of the numeric identifier and the random number to generate a string of digits;
    - reversing the digits in the string of digits, wherein a first and a last digit in the string of digits remain in their place if the last digit is zero;
    - replacing the digits with a combination of themselves and a digit to their left, wherein the first digit remains unchanged; and
    - formatting the combination to derive the numeric conference identifier unique to the conference;
  - determine the communication server associated with the requested conference based on decoding the numeric conference identifier according to the predefined algorithm;
  - contact the determined communication server; and
  - facilitate the conference upon receiving an affirmative response from the contacted communication server.

12. The system of claim 11, wherein
- the numeric conference identifier is a pseudo-random number designed to increase a user confidence in uniqueness of the number;
- the first digit of the numeric conference identifier is a non-zero digit; and
- a plurality of conferences managed by the same communication server are assigned numeric conference identifier appearing to be unrelated.

13. The system of claim 11, wherein the CAA endpoint is further configured to:
- contact another communication server in response to one of: receiving a notification from a first contacted communication server that the server is not responsible for the requested conference and receiving a notification that the first contacted communication server is not responsive.

14. The system of claim 11, further comprising a UC database server configured to store and retrieve issued numeric conference identifiers.

15. A computer-readable memory device with instructions stored thereon for facilitating conferencing within a Unified Communication (UC) network with distributed resource architecture, the instructions comprising:
- encoding a numeric conference identifier for a scheduled conference employing a predefined algorithm based on a combination of a conference directory identifier assigned to a conference resource responsible for the scheduled conference and a local identifier by:
  - formatting the combination to derive the numeric conference identifier unique to the conference;
  - appending a ceiling function of a logarithm of the conference directory identifier and the numeric identifier to generate a string of digits;
  - reversing the digits in the string of digits, wherein a first and a last digit in the string of digits remain in their place if the last digit is zero; and
  - replacing the digits with a combination of themselves and a digit to their left, wherein the first digit remains unchanged;
- receiving a request to join the scheduled conference from a non-UC network caller, the request including the numeric conference identifier associated with the conference;
- determining a SIP URI of the responsible conference resource associated with the requested conference based on decoding the numeric conference identifier employing an inverse of the predefined algorithm;
- contacting the determined conference resource; and
- facilitating the conference upon receiving an affirmative response from the contacted conference resource.

16. The computer-readable memory device of claim 15, wherein the request to join the scheduled conference is received and validated at a CAA endpoint prior to decoding of the numeric conference identifier.

17. The computer-readable memory device of claim 15, wherein the numeric conference identifier is a number unique to the scheduled conference with a non-zero first digit formatted such that a plurality of conferences associated with the same conference resource are assigned numeric conference identifiers that appear unrelated.

18. The computer-readable memory device of claim 15, wherein the conference is a multi-modal conference.

* * * * *